Aug. 11, 1953 E. P. THIAS 2,648,814

ULTRAHIGH-FREQUENCY COUPLING MEANS

Filed Nov. 22, 1949

EDWIN P. THIAS
INVENTOR.

HUEBNER, BEEHLER, WORREL,
HERZIG and CALDWELL.
ATTORNEYS.

BY Conrad C. Caldwell

Patented Aug. 11, 1953 2,648,814

UNITED STATES PATENT OFFICE 2,648,814

ULTRAHIGH-FREQUENCY COUPLING MEANS

Edwin P. Thias, Los Angeles, Calif., assignor to Standard Coil Products Co., Inc., Chicago, Ill., a corporation of Illinois Application November 22, 1949, Serial No. 128,709

6 Claims. (Cl. 323—76)

This invention relates to a turret type tuning unit and particularly to features thereof for adapting a turret type tuning unit, designed for operation at very high frequencies to operation at ultra high frequencies.

The present invention relates to means for adapting a tuner of the type described in copending application of Edwin P. Thias and Warren W. White, Serial No. 40,394, filed July 23, 1948, now Patent No. 2,496,183, to ultra high frequency operation. The copending application referred to describes and claims the mechanical features of a turret adapted to removably hold a plurality of pairs of panels. Each pair of panels mounts complementary circuit components having external contacts adapted to be brought in position, by rotation of the turret, to be contacted by stationary contactor elements effective to incorporate the components of the pair of panels in an external circuit. According to the disclosure of the copending application, the panels of each pair are completely insulated from each other and are separated by a metallic shield. It is an object of the present invention to provide means whereby the circuit components on each of a pair of removable panels may be electrically coupled independently of any connections external to the turret. In other words, the panels are so constructed that when mounted on the turret in the manner described in the copending application, the circuit components will be electrically coupled in the desired manner at all times. It is, therefore, an object of this invention to provide means to adapt a multi-panel circuit component-supporting assembly for use with panels electrically connected together.

It is a further object of this invention to provide removable panels for a turret type tuning means to adapt a tuner, designed for very high frequency operation, to operation at ultra high frequencies.

It is a further object of this invention to accomplish the adaptation set forth above by a change in the structure of the removable panels only.

It is another object of this invention to accomplish such adaptation by providing electrical coupling means between adjacent panels mounted on a common support.

It is a still further object of this invention to accomplish the above-described adaptation in a simple and economical manner.

Further objects and advantages will become apparent as the description proceeds in connection with the accompanying drawings, wherein:

Fig. 1 illustrates generally a turret type support for circuit components, as fully described in the copending application referred to above, but with the removable panels thereon incorporating the invention herein described.

Figure 1:
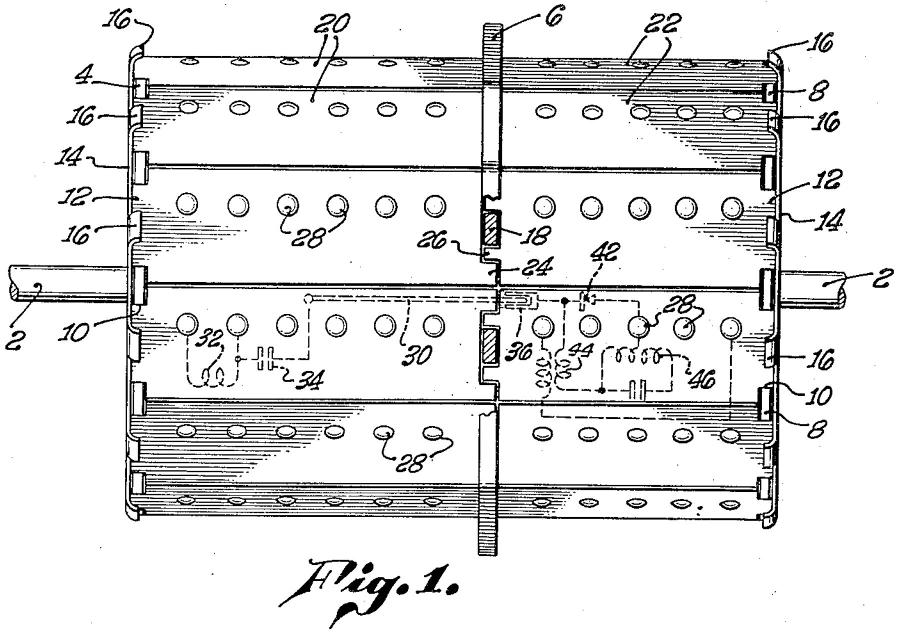
Fig. 1 is a plan view of a turret assembly with panels of the present invention mounted thereon, certain portions of the turret structure being shown in section.

Briefly, the turret structure comprises a central shaft 2 having spaced paralel metallic plates 4, 6 and 8 fixedly mounted thereon. The end plates 4 and 8 are provided with peripheral notches 10 adapted to receive tongue portions 12 of the removable panel structures. Fixed to the outer face of each of the discs or plates 4 and 8 is a retainer structure 14 comprising a plate of spring material, preferably metal, having radially extending spring fingers 16 overlying the tongue portions 12 of the removable panels.

The central plate 6 is provided with a circumferential series of openings therethrough at a radius substantially equal to the radial distance of the notches 10, previously described, from the shaft 2. The openings through the central plate 6 are separated by radially extending portions 18. The outer periphery of the plate 6 may be serrated or scalloped to provide an indexing structure, all as clearly described in the copending application.

The removable panels 20 and 22, having the tongues 12, are also provided with extending projections 24 and 26, respectively, at their other ends and so proportioned and positioned as to extend into the openings in the plate 6 to maintain the inner ends of the panels 20 and 22 in assembled relationship on the turret, also as described in detail in the copending application above-identified.

According to the disclosure of the copending application, the panel 20 may have mounted thereon circuit components comprising an oscillator inductance and other circuit components. The panel 22, of the copending disclosure, is contemplated to support antenna coupling means. In operation of such a unit, as described in the copending case, the plate 6 constitutes a shield to prevent electrical coupling between the components on the two panels.

Rotation of the turret structure is accomplished to bring the external contacts 28 into position to engage fixed contacting elements to incorporate the components of an adjacent pair of panels 20—22 into a fixed external circuit.

The structure described in the copending application is not adaptable for use at ultra high frequencies because of the inherently high inductance and capacitance of the external switching contacts. In order to make successful adaptation to ultra high frequencies, it is desirable to include as one of the components on panel 22 the high frequency mixing circuits for a superheterodyne type receiver. In order to successfully operate said mixing circuits, it is necessary that a definite and controllable amount of high frequency energy from the oscillator circuits mounted on the panel 20 be fed through an electrical path to said mixing circuits.

To accomplish the necessary transfer of energy to the components of the panel 22, the panels are provided with conductors, preferably embedded in the insulating bodies thereof, in such a way that when the panels are in position on the turret, the conductors will be in such relative position as to constitute an energy-transferring circuit.

Figure 2:
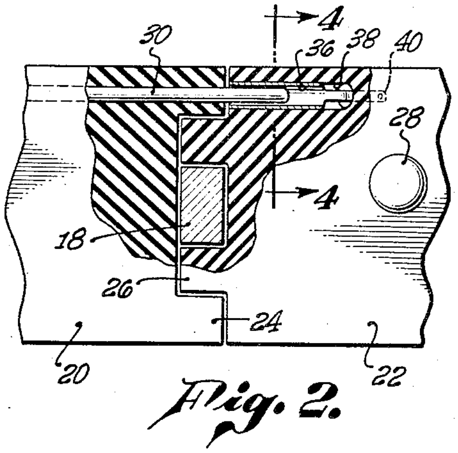
Fig. 2 is an enlarged fragmentary view of one specific embodiment of the invention.
Figure 4:
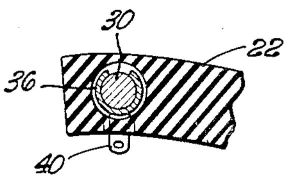
Fig. 4 is a further enlarged fragmentary sectional view taken substantially along the line 4—4 of Fig. 2.

As shown in Figs. 1, 2 and 4, a conductor 30, which may be suitably electrically connected to an oscillator coil 32 through a capacitor 34, is embedded in the body of the panel 20, which body is constructed of an insulating material. The conductor 30 extends through an end portion of the panel 20 at the portion thereof which extends into one of the openings in the plate 8 and which is normally in contact with a similar end portion of the panel 22. In the embodiment of Figs. 1 and 2, the conductor 30 extends beyond the end of the panel 20 and into a resilient metallic socket member 36 mounted in a bore 38 in the body of panel 22. The socket 36 may have a tab 40 extending through the inner face of the panel 22 and suitably connected, through such means as a rectifier 42 and I. F. transformer primary 44, to a circuit 46, resonant at the desired ultra high frequency.

The socket member 36 may be a split cylindrical structure as shown in Figs. 2 and 4, adapted to resiliently grip the projecting end portion of the conductor 30. Such a connection establishes a direct electrical path between components on the panels from the turret for substitution of panels of like construction having different component values.

Figure 3:
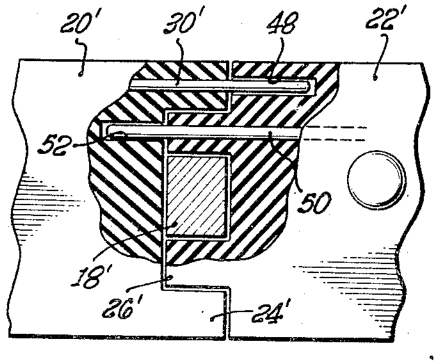
Fig. 3 is an enlarged fragmentary view, with parts shown in section, of a further specific embodiment of the invention.

Fig. 3 illustrates a modified form of connection, wherein a conductor 30′ embedded in the panel 20′ (corresponding to the panel 20 of Fig. 1) extends therebeyond into an opening 48 in the panel 22′. A second conductor 50 similarly embedded in the body of the panel 22′ extends therebeyond into an opening 52 in the end portion of the panel 20′. The ends of the conductors 30′ and 50 extend past each other in spaced parallel relationship and material of which the panels 20′ and 22 are made occupies a major portion of the space therebetween and constitutes a dielectric of high specific inductive capacity between the "plates" defined by the end portions of the conductors 30′ and 50. In such an arrangement as shown in Fig. 3, the capacitor 34, described in connection with Fig. 1, may be eliminated and the capacity thereof supplied by the relationship between the conductors 30′ and 50. Clearly, such a coupling arrangement as shown in Fig. 3 provides for ready removal and replacement of panels 20′ and 22′ without the necessity of providing external switching means.

In some instances or installations, it may be desirable to provide a plurality of such coupling means between the components of any pair of panels and the present invention contemplates the provision of any number of such coupling means between a single pair of panels.

Clearly other specific forms of connector other than that shown in Figs. 2 and 4 may be employed since suitable means are well known in the art and readily available.

Although a limited number of specific embodiments of the invention have been illustrated and described herein, it is to be understood that the invention is not to be limited thereto but may encompass other modifications falling fairly within the scope of the appended claims.

I claim:

1. A pair of detachably interlocking panels utilized in television turret type tuning units, a shielding member mounted between said panels and supporting said panels, at least one conductor carried by each of said panels, each of said conductors protruding from one end of one of said panels, the end portion of the other of said panels being complementary shaped to receive said protruding portion of said conductors, said protruding conductors connecting a portion of said circuit components mounted on one of said panels to a portion of circuit components mounted on the other of said panels and extending through said shielding member, said shielding member effectively isolating the remaining circuit components on the said one of said panels from the remaining circuit components on the other of said panels.

2. A tuning unit as defined in claim 1 wherein the end of one of said conductors is formed as a resilient socket and the end of the other conductor of the pair is formed as a plug member receivable in said socket to effect said coupling.

3. A tuning unit as defined in claim 1 wherein the adjacent ends of said conductors are in spaced relationship when said panels are mounted on said unit to thereby effect capacity coupling between circuit components on said pair of panels.

4. A tuning unit as defined in claim 1 wherein the ends of said conductors are arranged to extend past each other in spaced parallel relationship to thereby effect capacity coupling between circuit components on said pair of panels.

5. A tuning unit as defined in claim 4, wherein at least a portion of the space between the spaced ends of said conductors is occupied by insulating material of said panels to increase the capacity of said coupling.

6. In a tuning unit comprising a plurality of circuit elements individually mounted on panels; a connection between a pair of said elements comprising a capacitor; one electrode of said capacitor being carried by one of said panels, the other electrode of said capacitor being carried by the other of said panels; releasable supports for said panels positioning said panels in predetermined relation to each other causing said electrodes of said capacitor to be positioned at a predetermined spaced relation to each other producing a predetermined capacitance; each of said electrodes extending into one of said panels for connection to said circuit elements carried by said panel.

EDWIN P. THIAS.

References Cited in the file of this patent

UNITED STATES PATENTS

| Number | Name | Date |
|---|---|---|
| 2,124,207 | Neesen | July 19, 1938 |
| 2,496,183 | Thias et al. | Jan. 31, 1950 |